United States Patent
Doner

(10) Patent No.: US 6,405,127 B1
(45) Date of Patent: Jun. 11, 2002

(54) METHOD FOR DETERMINING STATIONARY LOCOMOTIVE LOCATION IN A RAILYARD

(75) Inventor: John R. Doner, Melbourne, FL (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/663,112

(22) Filed: Sep. 15, 2000

(51) Int. Cl.$^7$ .............................................. H04B 7/185
(52) U.S. Cl. ...................... 701/207; 701/200; 701/213; 342/357.06; 342/357.08
(58) Field of Search ................................ 701/200, 207; 340/7.21, 7.28, 988, 989, 993, 825.49; 346/2 R, 122 R; 342/357.08, 358, 357.06

(56) References Cited

U.S. PATENT DOCUMENTS

| | | | |
|---|---|---|---|
| 4,884,208 A | 11/1989 | Marinelli et al. ............ 182/201 |
| 4,901,084 A | 2/1990 | Hugueniun et al. ......... 342/179 |
| 4,923,303 A | 5/1990 | Lutz ............................ 356/620 |
| 5,013,927 A | 5/1991 | Tsikos et al. ........... 250/559.08 |
| 5,101,444 A | 3/1992 | Wilson et al. ............... 382/174 |
| 5,406,275 A | 4/1995 | Hassett et al. ............... 340/933 |
| 5,420,883 A | 5/1995 | Swenson et al. ............. 375/138 |
| 5,490,073 A * | 2/1996 | Kyrtsos ....................... 701/207 |
| 5,493,112 A | 2/1996 | Welch ......................... 250/221 |
| RE35,498 E * | 4/1997 | Barnard ...................... 342/357 |
| 5,620,155 A * | 4/1997 | Michalek .................... 246/121 |
| 5,706,014 A * | 1/1998 | Abbasi ..................... 342/357.1 |
| 5,805,288 A | 9/1998 | Simmons et al. ........... 356/614 |
| 5,831,574 A | 11/1998 | Krasner ................. 342/357.08 |
| 5,974,365 A | 10/1999 | Mitchell ..................... 702/150 |
| 6,016,119 A | 1/2000 | Krasner ................. 342/357.06 |
| 6,028,956 A | 2/2000 | Shustorovich et al. ...... 382/156 |
| 6,108,524 A * | 8/2000 | Hershey et al. ............. 455/67.1 |
| 6,128,501 A * | 10/2000 | Ffoulkes-Jones ............ 455/456 |
| 6,134,556 A | 10/2000 | Shin ........................... 707/102 |
| 6,199,045 B1 * | 3/2001 | Giniger et al. ................. 705/1 |
| 6,211,666 B1 | 4/2001 | Acker .................... 324/207.17 |
| 6,240,466 B1 | 5/2001 | McKeehan et al. ......... 709/316 |
| 6,289,282 B1 | 9/2001 | Hassler et al. .............. 701/303 |
| 6,290,187 B1 | 9/2001 | Egami .................... 246/122 R |
| 6,300,903 B1 | 10/2001 | Richards et al. ............ 342/450 |
| 6,321,090 B1 * | 11/2001 | Soliman ..................... 455/440 |

* cited by examiner

Primary Examiner—William A. Cuchlinski, Jr.
Assistant Examiner—Marthe Y. Marc-Coleman
(74) Attorney, Agent, or Firm—Carl A. Rowold; Armstrong Teasedale LLP

(57) ABSTRACT

A system for determining a locomotive within a railyard includes a base station, a base station receiver that receives location data pertaining to the base station location, a mobile receiver that receives location data pertaining to the location of locomotive, and a computer. The mobile receiver utilizes data from a group of satellites that are a subset of the satellite constellation used to obtain base station location data. The computer tracks base station location data and computes a position error for the base station. The computer applies the error to a locomotive estimated position resulting in an accurate locomotive location.

28 Claims, 2 Drawing Sheets

METHOD FOR DETERMINING STATIONARY LOCOMOTIVE LOCATION IN A RAILYARD

BACKGROUND OF THE INVENTION

This invention relates generally to locomotive railyard management, and more specifically, to determining the location of a locomotive in a railyard.

Railyards are the hubs of railroad transportation systems. Therefore, railyards perform many services, for example, freight origination, interchange, and termination, locomotive storage and maintenance, assembly and inspection of new trains, servicing of trains running through the facility, inspection and maintenance of railcars, and railcar storage. The various services in a railyard compete for resources such as personnel, equipment, and space in various facilities so that managing the entire railyard efficiently is a complex operation. Knowing the location of locomotives within the railyard is useful information for effective management of a railyard and railyard resources.

Satellite tracking systems, such a Global Positioning Systems (GPS), are traditionally used to track locomotive location. However, prior to May 2, 2000 the Department of Defense restricted the use of GPS limiting its accuracy. This limited accuracy mode is referred to as selective availability (SA). While SA was active, the GPS satellite signals included pseudorandom perturbations of the timing data broadcast in the signal. These perturbations caused geolocation algorithms used in GPS receivers to miscalculate the distance to each satellite causing the geometric solution for the location of the receiver to be less accurate. Additionally, GPS signals are affected by refraction and multipath reflections, associated with conditions in the ionosphere and troposphere. The obsolescence of SA removes a significant source of error in GPS signals.

The refraction and multipath effects visited on the signals arriving from GPS satellites remain a source of error. The concept of differential Global Positioning Systems (DGPS) can be used to overcome refraction and multipath effects. A traditional DGPS system includes a single fixed base station receiver and one or more other receivers, which are generally referred to as the mobile units. The base station GPS antenna is placed at a precisely known location so that each GPS-based position estimate obtained at the base station can be compared to its known position, and the error assessed. The mobile units also obtain GPS-based position estimates, which are likewise subject to error, but since they are not generally at precisely known positions, they have no better information available than that provided by the GPS estimate.

The nature of the GPS error is that the refraction and multipath effects visited on the signals arriving from the GPS satellites are nearly identical within a small area on the Earth. Thus, mobile units will be subject to nearly the same errors as the base station, so if the base station transmits that error profile to the mobile units, they will be able to correct their GPS estimates and establish much more accurate positions than otherwise.

However, if the base station and mobile unit are using different sets of satellites to compute position during the relevant interval of collection, then the positional error of the base station will be quite different from the error computed at the mobile unit. Additionally, if the mobile unit is collecting GPS readings at different moments than the base station, some small amount of error is introduced to the DGPS process.

In a railyard scenario, locomotives equipped with a mobile GPS receiver move on tracks having a minimal separation of thirteen feet. Therefore, a location tracking system that can identify the location of a locomotive with a tolerance of less than thirteen feet is beneficial in optimizing railyard management. To optimize locomotive location accuracy within a railyard, there exists a need to resolve the error in DGPS locomotive location systems caused by the base station and locomotive receiving signals from different satellites and at different times.

BRIEF SUMMARY OF THE INVENTION

In one embodiment, a system is provided for overcoming errors in DGPS locomotive location systems and accurately determining a locomotive location within a railyard. The system includes a base station having a known fixed position, which includes a GPS receiver and a computer to receive data and compute locomotive location estimates, a mobile GPS receiver and a computer coupled to the locomotive, and a one-way communications link from the locomotive to the base station to transmit locomotive GPS data. The locomotive computer sends aggregated GPS data to the base station computer, in a form that allows the base station computer to obtain a refined position estimate for the locomotive, using mathematical functions.

More particularly, the location of a locomotive is tracked using data from satellites that are a subset of the satellite constellation used to track the location of a base station. A mobile receiver coupled to the locomotive communicates to a computer a stream of data containing an estimated position of the locomotive and data pertaining to the satellites used in gathering the location data and the times the data was received. A base station receiver continuously sends base station location data to the computer, which electronically stores the data. The computer interprets the information in the data stream and computes an estimated position for the base station. The computer then determines a positional error using a known fixed location of the base station and applies this positional error to the locomotive estimated position to obtain an accurate location of the locomotive, thereby improving railyard management by determining locomotive position to the correct track.

DETAILED DESCRIPTION OF THE INVENTION

Figure 1:
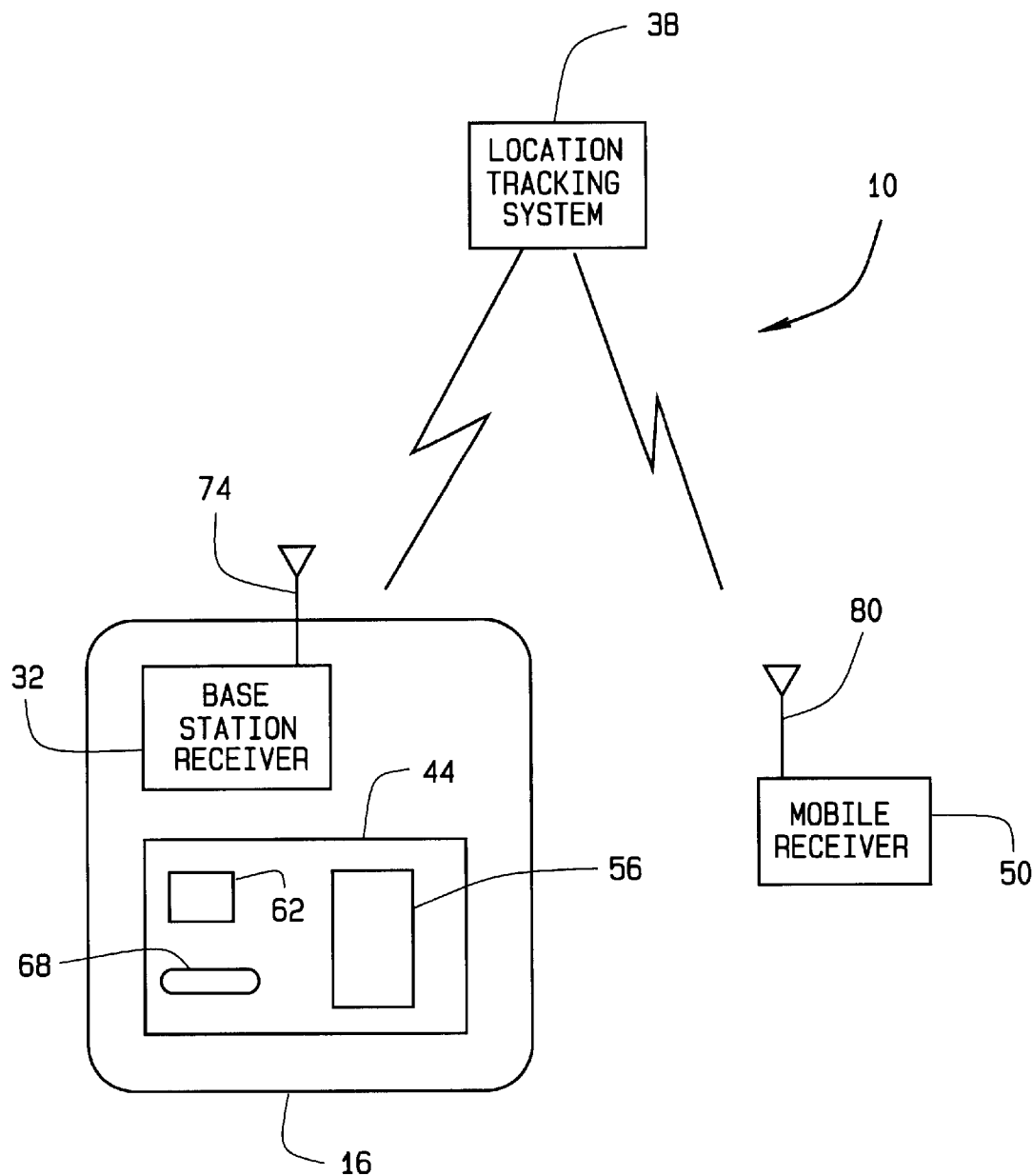
FIG. 1 is a block diagram of a locomotive location system.

FIG. 1 is a block diagram of a locomotive location system 10 used to overcome errors in DGPS locomotive location systems and accurately determine a locomotive location in accordance with an exemplary embodiment of the present invention. System 10 includes a base station 16 having a known fixed position within a railyard. In an alternate embodiment base station 16 can be located at any known fixed position in close proximity to the railyard. Base station 10 includes a base station receiver 32 that receives location data identifying the location of base station 10 from a location tracking system 38. Base station receiver 32 computes the location of base station 16 using location data from location tracking system 38. Location tracking system 38 uses a satellite constellation that includes multiple satellites (not shown). In one embodiment, location tracking system 38 is a Global Positioning Satellite system (GPS). Base station 16 also includes a computer 44 that communicates with base station receiver 32. System 10 also includes a mobile receiver 50, coupled to a locomotive (not shown), that communicates with computer 44. Mobile receiver 32 receives location data identifying the location of the locomotive from tracking system 38. Mobile receiver 50 computes an estimated position of the locomotive using location data from location tracking system 38 and transmits the location to computer 44 in a data stream. Computer 44 includes a processor 56 suitable for carrying out all computer 44 functions, a display 62 for viewing information, and an input device 68.

In an exemplary embodiment base station receiver 32 is a twelve-channel GPS receiver. Base station receiver 32 includes an antenna 74 located at a height sufficient to permit antenna 74 a full view of all satellites above the horizon. Mobile receiver 50 includes an antenna 80 that cannot be assured a height allowing a full view of all satellites above the horizon. Therefore, mobile receiver 50 typically uses fewer satellites to compute the location of the locomotive than base station receiver 32 uses to compute the location of base station 16. However, the satellites used by mobile receiver 50 to compute the location of the locomotive are a subset of the satellite constellation used by base station receiver 32 to compute the location of base station 16.

Figure 2:
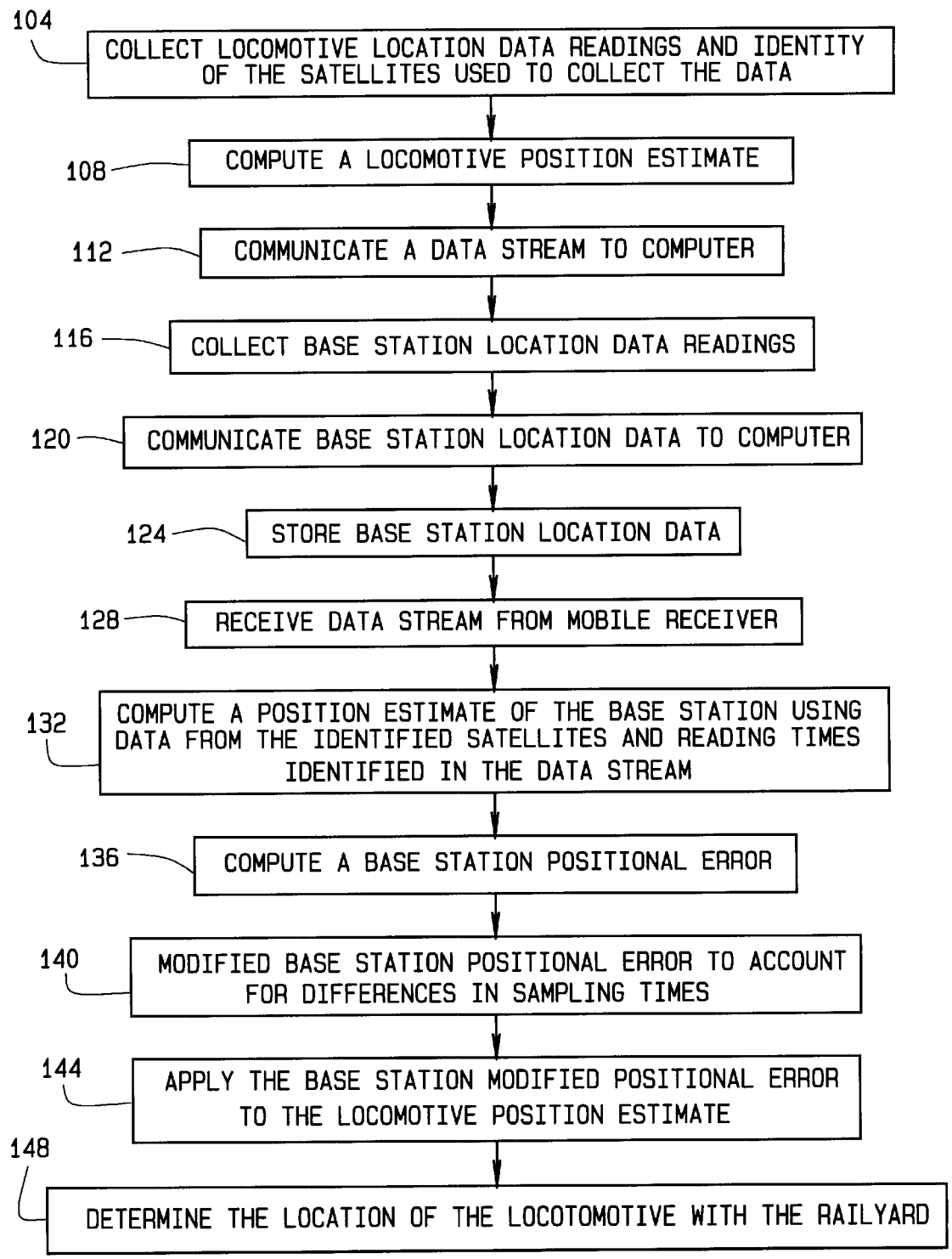
FIG. 2 is a flow chart of a locomotive location process used with the locomotive location system shown in FIG. 1.

FIG. 2 is a flow chart of a locomotive location process 100 utilized with a locomotive location system, such as system 10 (shown in FIG. 1). Mobile receiver 50 (shown in FIG. 1) collects 104 locomotive location data readings from a subset of the satellite constellation used in location tracking system 38 (shown in FIG. 1) and information identifying the subset of satellites. Mobile receiver 50 uses this information to compute 108 a locomotive position estimate and communicates 112 a data stream to computer 44 (shown in FIG. 1) containing the position estimate, times of data readings, and identity of which satellites were used. Base station receiver 32 (shown in FIG. 1) collects 116 base station location data from all the satellites in the satellite constellation of location tracking system 38. Base station receiver 32 communicates 120 the location data to computer 44 (shown in FIG. 1) and computer 44 electronically stores 124 the data.

Upon receipt 128 of the data stream from mobile receiver 50, computer 44 computes 132 a position estimate of base station 16 (shown in FIG. 1) using data from the satellites and reading times identified in the data stream. Computer 44 computes 136 a base station positional error using the difference in the position estimate and the known fixed position of base station 16. The base station positional error is then modified 140 to account for differences in the time of sampling of locomotive data readings and the time of sampling of base station data readings. Since the same satellites have been used to compute the locomotive position estimate as the base station position estimate, the base station modified positional error is applied 144 to the locomotive position estimate to accurately determine 148 the location of the locomotive with the railyard.

Railyard management is an ongoing process, therefore tracking the location locomotives is performed from the time a locomotive enters the railyard to the time the locomotive exits the railyard. When the locomotive first enters a railyard, mobile receiver 50 begins to collect location data readings continuously at a predetermined interval, for example one second intervals. Mobile receiver 50 averages the location data and computes a locomotive position estimate. Mobile receiver 50 then communicates a data stream to computer 44 containing the averaged location data along with the times of the first and last data readings used in the computation.

The data stream sent to the base station also includes data identifying which satellites were used by mobile receiver 50 to compute the locomotive positional estimate. In an exemplary embodiment the data stream is sent using the following format:

$$t_0, s_1, s_2, \ldots, s_n, n_1, \pm s_{j_1}, n_2, \pm s_{j_2}, \ldots, n_k, \pm s_{j_k}, \text{lat}, \text{lon}$$

where $t_0$ is the initial time of data collection, $s_1, s_2, \ldots s_n$ are the GPS satellites in use by the locomotive at time $t_0$ $n_1, n_2, \ldots, n_k$ are numbers of seconds past $t_0$ at which the number of satellites in use changed, $\pm s_j$ is the designator of which satellite has been added or subtracted at the j-th transition in satellites used, and lat,lon are the averaged latitude and longitude readings provided by the locomotive for the entire time interval of concern.

Base station receiver 32 collects location data readings pertaining to the location of base station 16 from all the satellites in view of antenna 74. This data is collected continuously at the same predetermined interval that mobile receiver 50 collects data, for example one second intervals. Due to the position of antenna 74 base station receiver 32 collects location data from a superset of the satellites used by mobile receiver 50. Base station receiver 32 communicates the data received from all the satellites to computer 44. Additionally, computer 44 electronically stores a running account of base station position data received by base station receiver 32.

Unlike DGPS, when computer 44 receives a data stream from mobile receiver 50, computer 44 uses the stored log of base station location data for all satellites in view to compute a position estimate of its own position for the same instants of time and using the data from the satellites used by mobile receiver 50, as identified in the data stream. In one embodiment, computer 44 uses the stored log of base station location data to compute a base station position for the same instants of time and using only the data from the satellites used by mobile receiver 50, as identified in the data stream. Additionally, computer 44 computes a base station positional error based on the disparity between the position data received from location tracking system 38 and the known fixed position of the base station. For example, let $\theta$ be the latitude, and $\phi$ be the longitude components of location data sent by location tracking system 38. Furthermore, let the position estimate for base station 16 at time $t_1$ be denoted by $(\theta_B^{(i)}, \phi_B^{(i)})$, for i=0,1, . . . ,N−1, and let the known fixed position of base station 16 be given by $(\theta_B, \phi_B)$ Therefore, the base station positional errors, $(\mu_i, v_i)$, are computed using $$\begin{cases} \mu_i = \theta_B^{(i)} - \theta_B \\ v_i = \phi_B^{(i)} - \phi_B \end{cases}, \text{ for } i = 0, 1, \ldots, N-1.$$

Then, since the same satellite constellation has been used for the locomotive and base station position estimate at each instant $t_0, \ldots, t_{N-1}$, the positional errors at the base station will be essentially identical to those at the locomotive, and therefore the locomotive position can be determined by the equations adjusting the latitude position estimate, $\theta_l$, by $$\theta_L = \theta_L^{(t_0)} - \frac{1}{N}\sum_{i=0}^{N-1} \mu_i$$

and adjusting the longitude position estimate, φ, by $$\phi_L = \phi_L^{(t_0)} - \frac{1}{N}\sum_{i=0}^{N-1} v_i.$$

However, as in DGPS systems, these equations do not take into account that the sampling interval may not be the same for mobile receiver 50 and base station receiver 32. For example, if the time of sampling for base station receiver 32 is offset from that of mobile receiver 50, then $t_i, t_{i+1}$ represent two consecutive data samples for base station receiver 32 and $t'_i$ is an instant of sampling at mobile receiver 50, with $t_i < t'_i < t_{i+1}$. If $\mu_i, \mu_{i+1}$ are respectively, the errors in base station location data at times $t_i, t_{i+1}$, then the correct interpolation for the error in data received from mobile receiver 50 at time $t'_i$ is given by $$\mu'_i = \mu_i + \left(\frac{t'_i - t_i}{t_{i+1} - t_i}\right)(\mu_{i+1} - \mu_i)$$

and, $$v'_i = v_i + \left(\frac{t'_i - t_i}{t_{i+1} - t_i}\right)(v_{i+1} - v_i)$$

for i=0,1,2, . . . N wherein $\mu'_i$ is the modified latitude position error, $v_i$ is the longitude modified position error, t is the time of data collection, and N is the number of samples to be averaged.

Therefore, adjusting the position estimate to determine the locomotive position, and overcoming shortcomings in DGPS system is accomplished by using the equations $$\theta_L = \theta_L^{(t_0)} - \frac{1}{N}\sum_{i=0}^{N-1} \mu'_i$$

and, $$\phi_L = \phi_L^{(t_0)} - \frac{1}{N}\sum_{i=0}^{N-1} v'_i$$

wherein $\theta_L$, is the latitude position component, $\phi_L$, is the longitude position component, and N is the number of samples to be averaged.

System 10 tracks the location of the locomotive using data from satellites that are a subset of the satellite constellation used to track the location of the base station. The mobile receiver communicates to the computer a stream of data containing an estimated position of the locomotive and data pertaining to the satellites used in gathering the location data and the times the data was received. The base station receiver continuously sends base station location data to the computer, which electronically stores the data. The computer interprets the information in the data stream and computes an estimated position for the base station. The computer then determines a positional error using a known fixed location of the base station and applies this positional error to the locomotive estimated position to obtain an accurate location of the locomotive, thereby improving railyard management.

Although system 10 is described herein using a base station with 12 channels, it should be understood that a system that includes a base station with fewer than 12 channels and a mobile receiver that uses satellites that are a subset of the satellites used by the base station could be used with the invention. In addition, although system 10 is described herein in the context of a locomotive and railyard management, it should be understood that the invention is applicable to other objects and management systems, for example, airplanes at an airport, barges on a river, and trucks in a truck yard.

While the invention has been described in terms of various specific embodiments, those skilled in the art will recognize that the invention can be practiced with modification within the spirit and scope of the claims.

What is claimed is:

1. A method for determining the location of an object using a system, the system including a base station having a known fixed position, a base station receiver configured to receive location data from a first set of satellites, a mobile receiver coupled with the object configured to receive location data from a second set of satellites, with the second set of satellites being a subset of and thus fewer in number than the first set of satellites, and a computer configured to determine the location of the object from the location data, said method comprising the steps of:

utilizing the base station receiver to receive base station location data from the first set of satellites;

storing the base station location data from the first set of satellites using the computer;

utilizing the mobile receiver to receive object location data from the second set of satellites;

utilizing the computer and the stored base station location data from the first set of satellites to determine base station location data with respect to the second set of satellites, and a base station position estimate;

calculating a positional error in the base station position estimate relative to the known fixed position of the base station; and determining a calculated location of the object using the positional error and the object location data.

2. A method in accordance with claim 1 wherein the computer further configured to electronically store data, said step of utilizing the base station receiver to receive base station location data from the first set of satellites further comprises the steps of:

receiving the base station location data continuously at a predetermined sampling interval;

communicating the base station location data to the computer; and storing the base station location data in the computer.

3. A method in accordance with claim 2 wherein the mobile receiver further configured to compute an average fixed location of the object and communicate with the computer, said step of utilizing the mobile receiver to receive object location data from the second set of satellites further comprising the steps of:

receiving the object location data continuously at a predetermined sampling interval;

averaging the object location data to determine an averaged fixed position of the object; and communicating the averaged fixed position to the computer.

4. A method in accordance with claim 3 further comprising the step of identifying the satellites that comprise the second set of satellites.

5. A method in accordance with claim 4 wherein said step of identifying the satellites further comprises the step of communicating the averaged fixed position to the computer using a data stream format comprising $$t_0, s_1, s_2, \ldots, s_n, n_1, \pm s_{j_1}, n_2, \pm s_{j_2}, \ldots, n_k, \pm s_{j_k}, \text{lat}, \text{lon}$$

where $t_0$ is the initial time of data collection, $s_1, s_2, \ldots s_n$ are the satellites in use by the object at time to $n_1, n_2, \ldots n_k$ are numbers of seconds past $t_0$ at which the number of satellites in use changed, $\pm s_j$ is the designator of which satellite has been added or subtracted at the j-th transition in satellites used, and lat,lon are the averaged latitude and longitude readings for the object for the entire time interval of concern.

6. A method in accordance with claim 5 wherein said step of utilizing the stored base station location data from the first set of satellites and the computer to determine base station location data with respect to the second set of satellites further comprises the steps of parsing data from the first set of location data stored in the computer correlating to the same satellites and time interval identified in the data stream.

7. A method in accordance with claim 1 wherein said step of calculating a positional error further comprises the steps of:

determining the base station location based on the third set of location data; and determining a disparity between a known fixed location of the base station and a base station location determined using the third set of location data.

8. A method in accordance with claim 1 wherein said step of determining the location of the object using the positional error further comprises the steps of:

determining an average fixed position of the object based on the second set of location data;

modifying the position error to account for an offset between a sampling time of the first set of data, and a sampling time of the second set of data using the equation; and adjusting the average fixed position of the object using the modified position error.

9. A method in accordance with claim 8 wherein said step of modifying the position error to account for an offset between a sampling time of the first set of location data, and a sampling time of the second set of location data further comprises the step of modifying the latitude position error, $\mu_i$, by $$\mu'_i = \mu_i + \left(\frac{t'_i - t_i}{t_{i+1} - t_i}\right)(\mu_{i+1} - \mu_i)$$

and modifying the longitude positional error, $v_i$, by $$v'_i = v_i + \left(\frac{t'_i - t_i}{t_{i+1} - t_i}\right)(v_{i+1} - v_i)$$

for i=0,1,2, . . . N wherein t is the time of data collection, and N is the number of samples to be averaged.

10. A method in accordance with claim 8 wherein the step of adjusting the average fixed position of the object using the position error further comprises the step of adjusting the average latitude fixed position, $\theta_L$, by $$\theta_L = \theta_L^{(t_0)} - \frac{1}{N} \sum_{i=0}^{N-1} \mu'_i$$

and adjusting the average longitude fixed position, $\phi$, by $$\phi_L = \phi_L^{(t_0)} - \frac{1}{N} \sum_{i=0}^{N-1} v'_i$$

wherein $\mu'_i$ is the modified latitude positional error, $v'_i$ is the modified longitude positional error, and N is the number of sample to be averaged.

11. A system for determining a location of an object at rest on a path that lays in close proximity to at least one other path, said system comprising:

a base station having a known fixed position;

a base station receiver configured to receive base station location data from a first set of satellites;

a mobile receiver coupled to the object, said mobile receiver configured to receive object location data from a second set of satellites; and a computer configured to electronically store data including the base station location data from the first set of satellites, communicate with said base station receiver and said mobile receiver, and determine base station location data with respect to the second set of satellites using the stored base station location data from the first set of satellites.

12. A system in accordance with claim 11 wherein said base station receiver further configured to:

receive the base station location data from the first set of satellites continuously and at a predetermined sampling interval; and communicate the base station location data from the first set of satellites to said computer.

13. A system in accordance with claim 11 wherein said computer further configured to electronically store the base station location data from the first set of satellites.

14. A system in accordance with claim 11 wherein said mobile receiver further configured to:

receive the object location data from the second set of satellites continuously and at a predetermined sampling interval; and compute an averaged fixed position of the object using the object location data from the second set of satellites.

15. A system in accordance with claim 14 wherein said mobile receiver further configured to communicate with said computer using a data stream comprising the averaged fixed position, and information identifying the second set of satellites.

16. A system in accordance with claim 15 wherein said data stream configured to use a format comprising $$t_0, s_1, s_2, \ldots, s_n, n_1, \pm s_{j_1}, n_2, \pm s_{j_2}, \ldots, n_k, \pm s_{j_k}, \text{lat}, \text{lon}$$

where $t_0$ is the initial time of data collection, $s_1, s_2, \ldots s_n$ are the satellites in use by the object at time $t_0$ ($n \leq 8$), $n_1, n_2, \ldots, n_k$ are numbers of seconds past to at which the number of satellites in use changed, $\pm s_j$, is the designator of which satellite has been added or subtracted at the j-th transition in satellites used, and lat,lon are the averaged latitude and longitude readings for the object for the entire time interval of concern.

17. A system in accordance with claim 16 wherein the base station location data with respect to the second set of satellites comprises parsed data from the based station location data from the first set of satellites correlating to the same satellites and time interval identified in the data stream.

18. A system in accordance with claim 11 wherein said computer further configured to compute a base station location based on the base station location data with respect to the second set of satellites.

19. A system in accordance with claim 18 wherein said computer further configured to compute a position error comprising the disparity between the base station location based on the base station location data with respect to the second set of satellites and the known fixed location of said base station.

20. A system in accordance with claim 19 wherein said computer further configured to modify the position error to account for an offset between a sampling time of the base station location data with respect to the second set of satellites and a second sampling time of the object location data from the second set of satellites.

21. A system in accordance with claim 20 wherein said computer further configured to modify said latitude position error, $\mu_i$, using $$\mu'_i = \mu_i + \left(\frac{t'_i - t_i}{t_{i+1} - t_i}\right)(\mu_{i+1} - \mu_i)$$

and modify said longitude position error, $v_i$, using $$v'_i = v_i + \left(\frac{t'_i - t_i}{t_{i+1} - t_i}\right)(v_{i+1} - v_i)$$

for i=0,1,2, . . . N wherein t is the time of data collection, and N is the number of samples to be averaged.

22. A system in accordance with claim 20 wherein said computer further configured to compute the location of the object by adjusting the average fixed position using the modified position error.

23. A system in accordance with claim 22 wherein said computer further configured to compute the latitude, $\theta_l$, of the object using $$\theta_L = \theta_L^{(t_0)} - \frac{1}{N}\sum_{i=0}^{N-1} \mu'_i$$

and compute the longitude, $\phi$, of the object using $$\theta_L = \theta_L^{(t_0)} - \frac{1}{N}\sum_{i=0}^{N-1} v'_i$$

wherein $\mu'_i$ is the modified latitude positional error, $v'_i$ is the modified longitude positional error, and N is the number of sample to be averaged.

24. A system in accordance with claim 11 wherein the object comprises a locomotive.

25. A method for determining the location of an object using a system, the system including a base station, a base station receiver configured to receive location data from a first set of satellites, a computer, and a mobile receiver coupled with the object configured to receive location data from a second set of satellites, with the second set of satellites being a subset of and thus fewer in number than the first set of satellites, said method comprising:

utilizing the base station receiver to receive base station location data from the first set of satellites;

storing the base station location data from the first set of satellites using the computer; and utilizing the mobile receiver to receive object location data from the second set of satellites.

26. A method in accordance with claim 25 further comprising:

utilizing the stored base station location data from the first set of satellites and the computer to determine base station location data with respect to the second set of satellites; and utilizing the base station location data with respect to the second set of satellites and the computer to determine a base station position estimate.

27. A method in accordance with claim 26, wherein the base station has a known fixed position and said method further comprises calculating a positional error in the base station position estimate relative to the known fixed position of the base station.

28. A method in accordance with claim 27 further comprising determining a calculated location of the object using the positional error and the object location data.

* * * * *

UNITED STATES PATENT AND TRADEMARK OFFICE
CERTIFICATE OF CORRECTION

PATENT NO. : 6,405,127 B1
DATED : June 11, 2002
INVENTOR(S) : John R. Doner

It is certified that error appears in the above-identified patent and that said Letters Patent is hereby corrected as shown below:

Column 7,
Line 11, delete "to" insert -- $t_0$ --.

Column 8,
Line 2, delete "$\theta_l$" insert therefor -- $\theta_L$ --.
Line 64, delete "past to" insert therefor -- past $t_0$ --.

Column 9,
Line 49, delete "$\theta_l$" insert therefor -- $\theta_L$ --.

Signed and Sealed this

Twenty-third Day of December, 2003

JAMES E. ROGAN
*Director of the United States Patent and Trademark Office*